United States Patent [19]

Lee

[11] Patent Number: 5,570,530
[45] Date of Patent: * Nov. 5, 1996

[54] BOWFISHING ARROWHEAD

[76] Inventor: Richard D. Lee, 874 Meadow Ave., Yuba City, Calif. 95991

[ * ] Notice: The portion of the term of this patent subsequent to Feb. 21, 2010, has been disclaimed.

[21] Appl. No.: 783,528

[22] Filed: Oct. 28, 1991

[51] Int. Cl.⁶ .............................. A01K 81/00; F42B 6/08
[52] U.S. Cl. ........................................ 43/1; 43/6; 273/419
[58] Field of Search .............................. 43/1, 6; 273/419, 273/422

[56] References Cited

U.S. PATENT DOCUMENTS

| | | | |
|---|---|---|---|
| 2,289,284 | 7/1942 | Chandler | 273/419 X |
| 3,164,385 | 1/1965 | Shure | 273/419 |
| 3,398,960 | 8/1968 | Carroll | 273/419 X |
| 4,742,637 | 5/1988 | Musacchia | 43/6 |
| 4,807,382 | 2/1989 | Albrecht | 43/6 |
| 4,819,360 | 4/1989 | Thomas | 43/6 |
| 4,901,467 | 2/1990 | Stolpe | 43/6 |

Primary Examiner—P. Austin Bradley
Assistant Examiner—Jeanne M. Elpel

[57] ABSTRACT

An arrowhead apparatus includes an elongate rigid cylindrical body formed with an arrow tip receiving bore directed through a forward end of the body, with the arrowhead body including a slot contained within the body, with the slot including a slot axle spaced from a forward end of the slot and wherein the axle pivotally mounts a plurality of blade members, wherein each blade member includes an abutment leg that is in abutment with a threaded boss of the arrow tip projecting into the slot in a first position, wherein the arrow boss is threadedly displaced from the slot in a second position permitting interfolding of the blades in an adjacency configuration relative to the body to permit ease of removal of the arrowhead relative to a game fish.

2 Claims, 4 Drawing Sheets

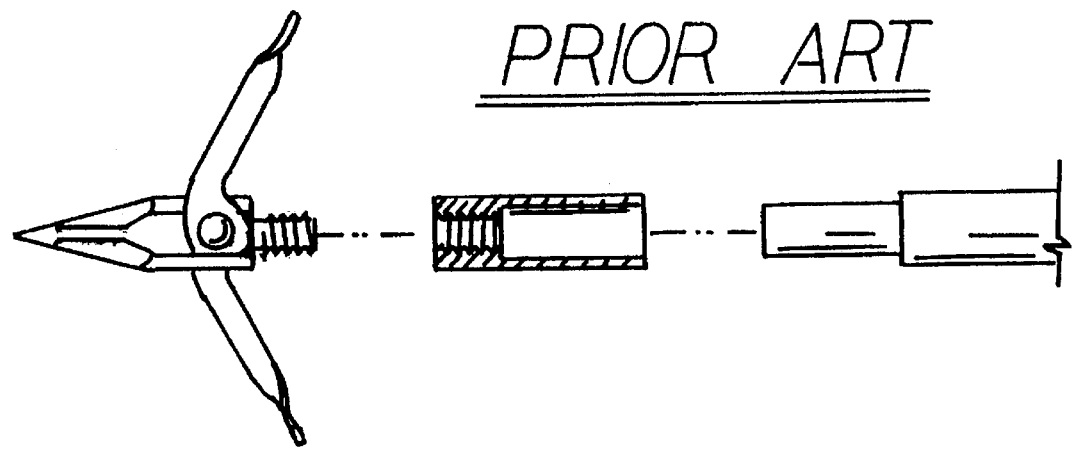
FIG 1 *PRIOR ART*
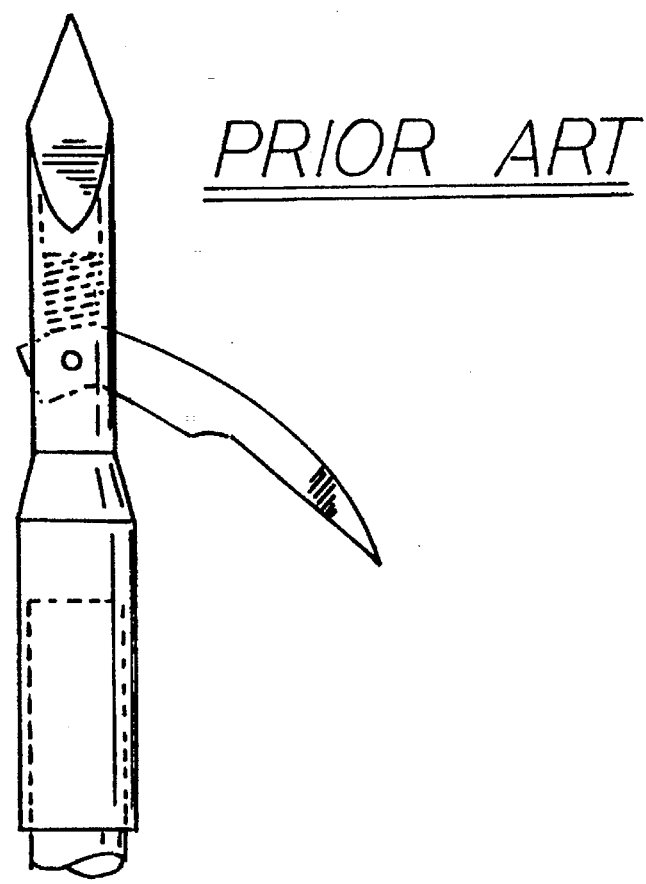
FIG 2 *PRIOR ART*

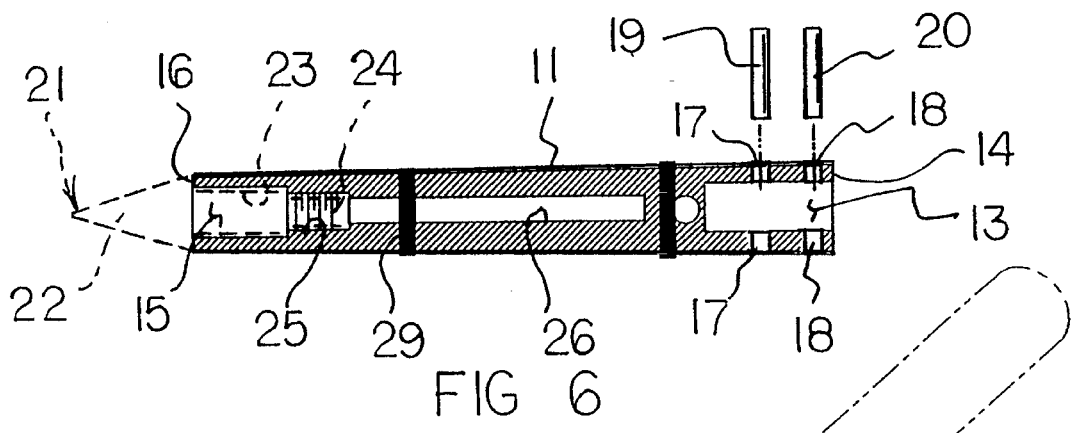
FIG 6
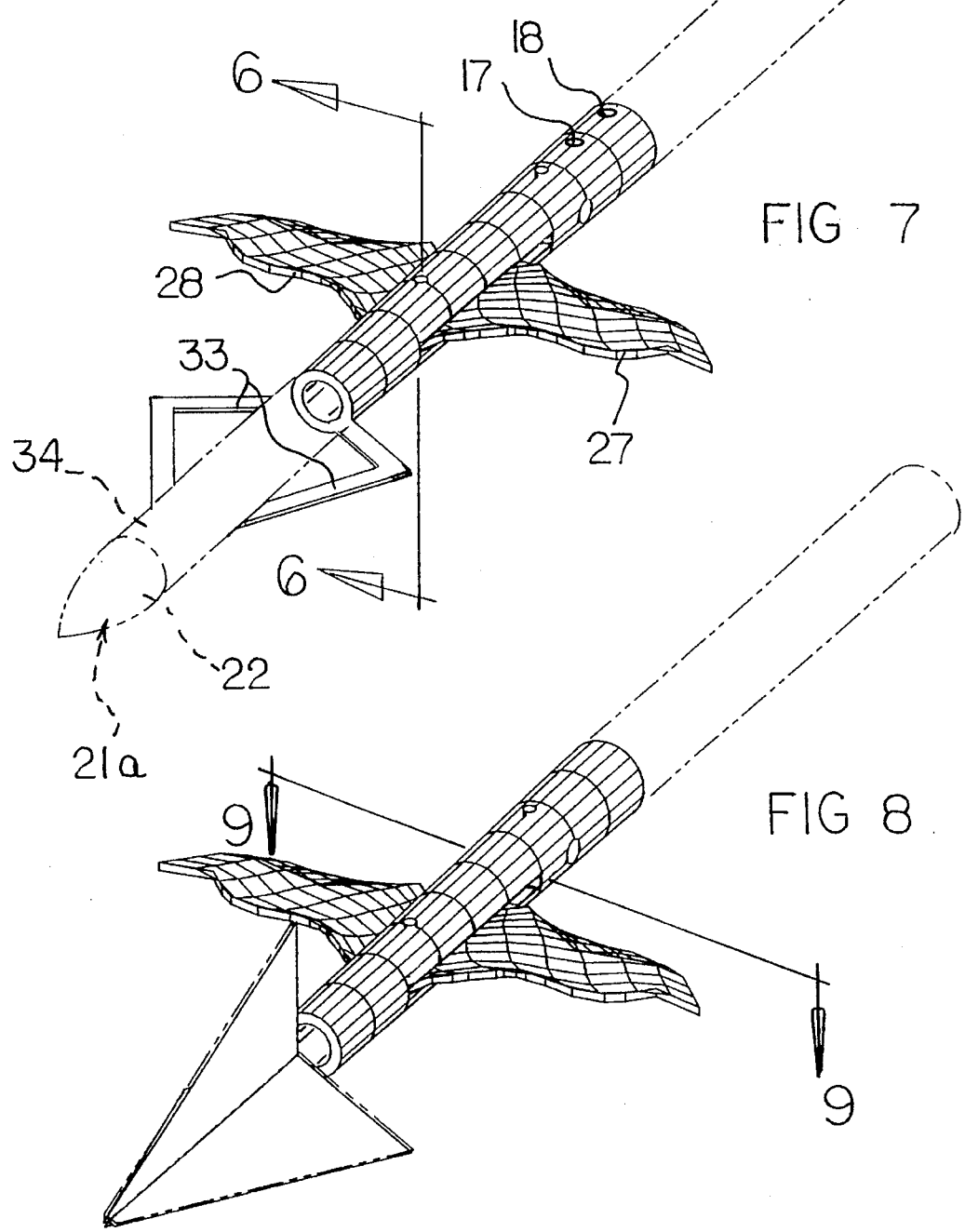
FIG 7
FIG 8

BOWFISHING ARROWHEAD

BACKGROUND OF THE INVENTION

1. Field of the Invention

The field of invention relates to bowfishing apparatus, and more particularly pertains to a new and improved bowfishing arrowhead wherein the same is arranged for ease of removal subsequent to it being directed through an associated game fish.

2. Description of the Prior Art

Bowfishing is presented as a popular sport and specialty arrowheads have been provided for application to this particular application of fishing. In use of such arrowhead structure, arrowhead structure is provided with blades that are directed to extend laterally to opposed sides of associated arrowhead to prevent the arrowhead from being easily removed from a game fish, as the game fish is subject to violent gyrations subsequent to its being struck by the associated arrow and the tip that is commonly directed to extend completely through the associated fish. Removal of the arrowhead structure is frequently a problem and results in damage to the fish due to the blade structure projecting therefrom. The instant invention attempts to overcome deficiencies of the prior art by providing blade structure that is easily interfolded in a spaced relationship to extend forwardly of the tip in a second position from a first position that extends laterally of the tip to permit ease of removal of the arrowhead minimizing damage to the game fish. Prior art structure is exemplified in U.S. Pat. No. 4,807,382 to Albrecht; U.S. Pat. No 4,742,637 to Mussacchia; U.S. Pat. No. 3,164,385 to Shure; U.S. Pat. No. 4,901,467 to Stolpe; and U.S. Pat. No. 4,819,360 to Thomas utilizing blade structure mounted to opposed sides of an arrowhead structure, but wherein the organization provides for advantages over the prior art by providing the blades mounted within an enclosed slot within the arrowhead body, wherein simple longitudinal displacement of the arrowhead tip relative to the body permits interfolding of the blade structure relative to the arrowhead body and in this respect, the present invention substantially fulfills this need.

SUMMARY OF THE INVENTION

In view of the foregoing disadvantages inherent in the known types of arrowhead apparatus now present in the prior art, the present invention provides a bowfishing arrowhead wherein the same is arranged to permit interfolding of the blade members of an associated bowfishing arrowhead to a displaced position directed forwardly and in adjacency to the arrowhead body. As such, the general purpose of the present invention, which will be described subsequently in greater detail, is to provide a new and improved bowfishing arrowhead which has all the advantages of the prior art arrowhead apparatus and none of the disadvantages.

To attain this, the present invention provides an arrowhead apparatus including an elongate rigid cylindrical body formed with an arrow tip receiving bore directed through a forward end of the body, with the arrowhead body including a slot contained within the body, with the slot including a slot axle spaced from a forward end of the slot wherein the axle pivotally mounts a plurality of blade members, wherein each blade member includes an abutment leg that is in abutment with a threaded boss of the arrow tip projecting into the slot in a first position, wherein the arrow boss is threadedly displaced from the slot in a second position permitting interfolding of the blades in an adjacency configuration relative to the body to permit ease of removal of the arrowhead relative to a game fish.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bowfishing arrowhead which has all the advantages of the prior art arrowhead apparatus and none of the disadvantages.

It is another object of the present invention to provide a new and improved bowfishing arrowhead which may be easily and efficiently manufactured and marketed.

It is a further object of the present invention to provide a new and improved bowfishing arrowhead which is of a durable and reliable construction.

An even further object of the present invention is to provide a new and improved bowfishing arrowhead which is susceptible of a low cost of manufacture with regard to both materials and labor, and which accordingly is then susceptible low prices of sale to the consuming public, thereby making such bowfishing arrowheads economically available to the buying public.

Still yet another object of the present invention is to provide a new and improved bowfishing arrowhead which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view, partially in section, of a prior art bowfishing arrowhead.

FIG. 2 is an orthographic view of a further example bowfishing arrowhead.

FIG. 6 is an orthographic cross-sectional illustration of the arrowhead structure of the invention.

FIG. 7 is an isometric illustration of the arrowhead the invention utilizing a modified tip structure.

FIG. 8 is an isometric illustration of the invention utilizing a further modified arrowhead tip structure.

DESCRIPTION OF THE PREFERRED EMBODIMENT

Figure 3:
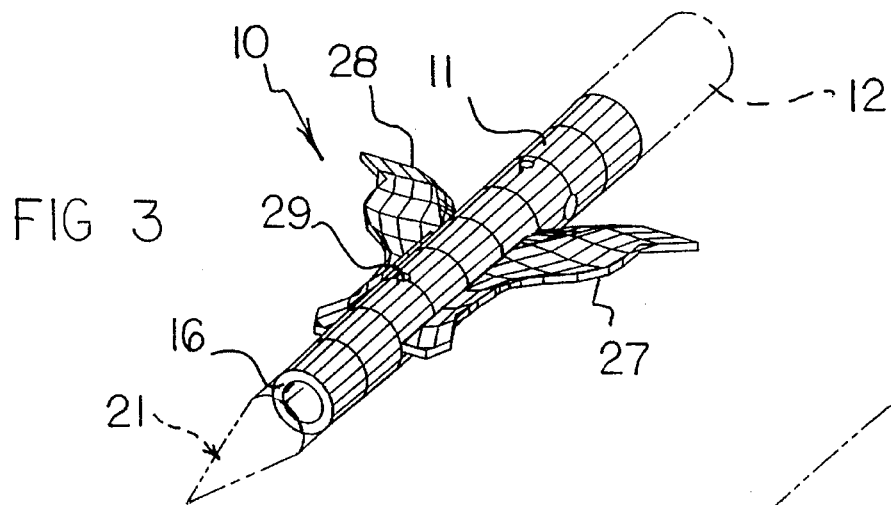
FIG. 3 is an isometric illustration of the instant invention.
Figure 4:
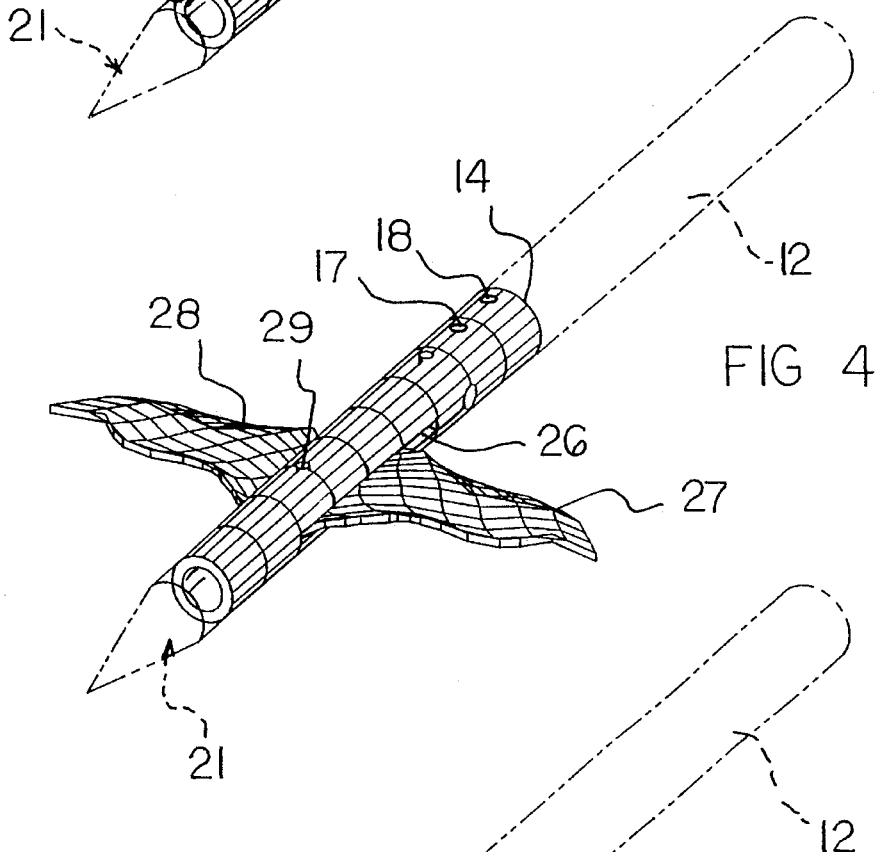
FIG. 4 is an isometric illustration of the instant invention with the arrowhead projected forwardly in a partial orientation relative to the cylindrical body.
Figure 5:
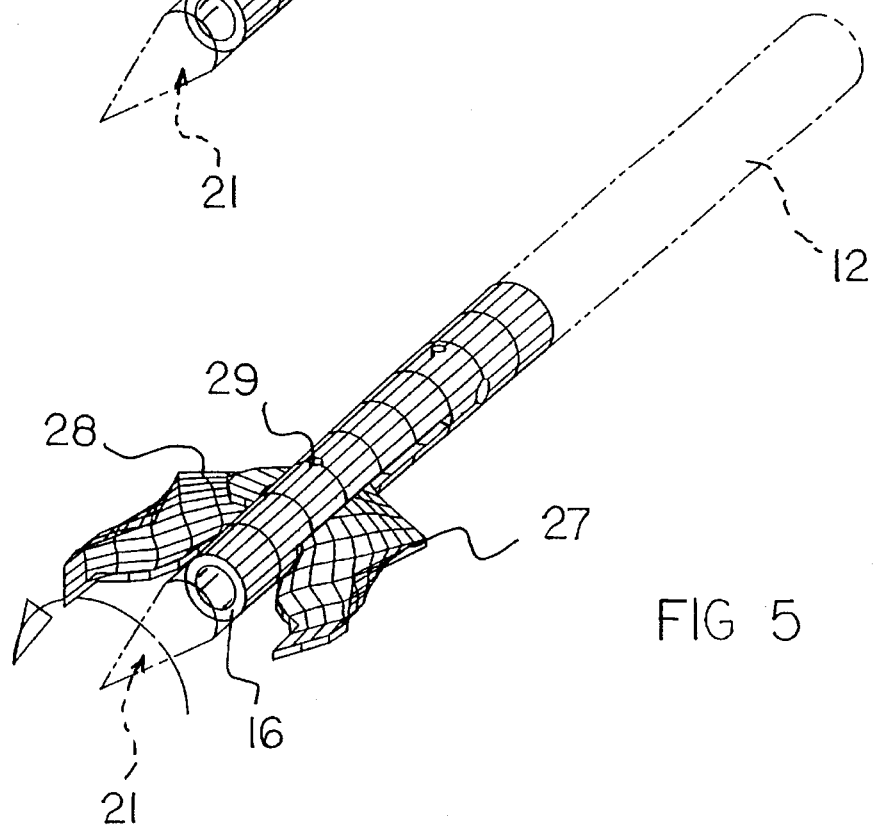
FIG. 5 is an isometric illustration of the invention with the blades projecting forwardly of the body's forward distal end in a second interfolded position.

With reference now to the drawings, and in particular to FIGS. 1 to 10 thereof, a new and improved bowfishing arrowhead embodying the principles and concepts of the present invention and generally designated by the reference numeral 10 will be described.

FIG. 1 illustrates a prior art arrowhead structure, wherein the blades are mounted laterally to opposed sides of the associated arrowhead tip, in a manner as set forth in U.S. Pat. No. 4,819,360. The FIG. 2 illustrates a further prior art arrowhead structure, as exemplified in U.S. Pat. No 4,901,467, with a single blade structure member mounted in the slotted arrowhead member, wherein the slot projects completely through a forward distal end of the cylindrical body of the structure.

More specifically, the bowfishing arrowhead 10 of the instant invention essentially comprises a cylindrical rigid body 11 defined by a predetermined first diameter to receive a cylindrical arrow shaft 12 within a shaft receiving cylindrical cavity 13 directed coaxially and interiorly of the cylindrical body 11 through a body rear distal end 14. A cylindrical tip receiving cavity 15 defined by a second diameter less than the first diameter directed into the cylindrical body coaxially thereof through a body forward distal end 16 is arranged to receive an arrow tip 21, in a manner to be discussed below. The shaft receiving cylindrical cavity 13 includes at least a first pin receiving bore pair 17, or optionally a second pin receiving bore pair 18, that are coaxially aligned and diametrically directed through the shaft receiving cylindrical cavity 13 to secure the cylindrical arrow shaft 12 within the shaft receiving cavity 13.

The cylindrical tip receiving cavity 15 slidably and complementarily receives an arrow tip shank 23 therewithin, wherein the shank is defined by a diameter substantially equal to the second diameter, with the arrow tip 21 formed with a conical forward end 22 coaxially mounted to a forward end of the arrow tip shank 23, wherein the conical forward end 22 includes a base equal to the predetermined first diameter 22 to prevent projection of the conical forward end 22 within the tip receiving cavity 15. The arrow tip shank 23 includes an arrow tip shank threaded boss 24 defined by a third diameter less than the second diameter that is coaxially aligned with the conical forward end 22 and the arrow tip shank 23 and is threadedly received within an internally threaded bore 25 that medially intersects a forward terminal end of an enclosed slot 26 defined by a width substantially equal to the first diameter diametrically directed through the cylindrical body 11 extending from and in communication with the internally threaded bore 25 and in a spaced relationship relative to the shaft receiving cavity 13. The slot axle 29 orthogonally oriented and directed through the closed slot 26 adjacent to and spaced from the slot forward terminal end and positioned in confrontation with the internally threaded bore 25 mounts a respective first and second blade 27 and 28. The first and second blades 27 and 28 are of a generally "L" shaped configuration to include a respective first and second blade abutment leg 30 and 31 contained within the slot 26 and defining an oblique included angle between each respective abutment leg and the blade structure of the first and second blades that extend exteriorly of the slot 26 and project laterally through the slot on opposed sides of the cylindrical body 11, in a manner as illustrated in the FIGS. 7-9 for example.

Figure 9:
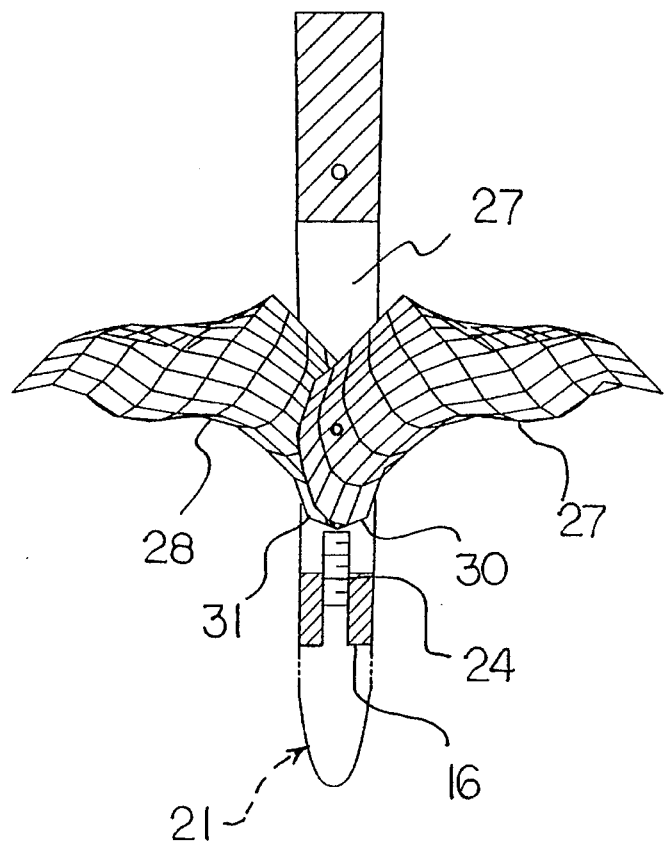
FIG. 9 is an orthographic view of the invention in a first position, taken along the lines 9—9 of FIG. 8.
Figure 10:
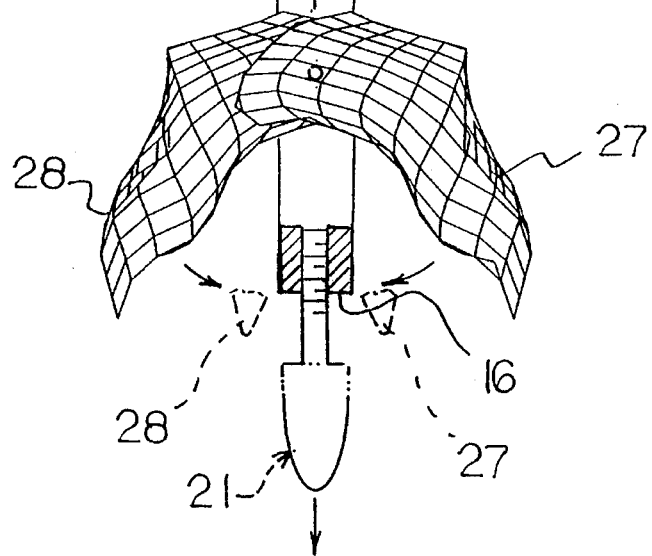
FIG. 10 is an orthographic view of the blade members rotated to a second position upon displacement of the arrowhead kip forwardly of the forward distal end of the cylindrical body.

In this manner, and as illustrated in FIG. 9, the threaded boss 24 projects into the slot 26 in abutment with the first and second blade abutment legs 30 and 31. Upon piercing of a fish body with the arrowhead 10, the arrow tip 21 can be rotated so as to displace the threaded boss 24 from the slot 26 and permit pivoting of the first and second blades 27 and 28 to position where they extend generally parallel to a cylindrical body axis 11a of the cylindrical body and forwardly of the body forward distal end 16, as shown in FIG. 10, to ease removal of the bowfishing arrowhead 10 from the associated game fish.

The FIG. 7 illustrates the use of a preferred modified arrow tip 21a, including the conical forward end 22 mounted to an elongate cylindrical tip body 34 between the conical forward end 22 and the arrow tip shank 23. The cylindrical tip body 34 includes a plurality of diametrically disposed "V" shaped cutting legs mounted to opposed sides of the cylindrical tip body 34, with a first and second cutting leg of the cutting legs 33 in general planar alignment with the first and second blades 27 and 28 to enhance effectiveness of the organization in the projection through and the clean capture of associated game fish.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An arrowhead comprising:

a cylindrical body having a forward end spaced from a rearward end and a cylindrical body longitudinal axis directed longitudinally through the forward and rearward ends, the cylindrical body being shaped so as to define a shaft receiving cylindrical cavity directed into the rearward end thereof, and a cylindrical tip receiving cavity directed into the forward end thereof, the cylindrical body being further shaped so as to define an enclosed slot directed diametrically through the cylindrical body and between the forward and rearward ends thereof, and an internally threaded bore extending from the cylindrical tip receiving cavity and into communication with the enclosed slot;

a slot axle mounted to the cylindrical body and extending substantially orthogonally relative to the cylindrical body longitudinal axis thereof, the slot axle being positioned between the forward and rearward ends of the cylindrical body and oriented proximal to the internally threaded bore;

a first blade having a first blade longitudinal axis; and a first blade abutment leg secured to the first blade and being oriented at a substantially orthogonal angle relative to the first blade longitudinal axis, the first blade being pivotally mounted about the slot axle proximal to a juncture of the first blade abutment leg and the first blade such that the first blade can project from a first side of the enclosed slot at an oblique angle relative to the cylindrical body longitudinal axis towards the rearward end of the cylindrical body and the first blade abutment leg can project from the first side of the enclosed slot at an oblique angle relative to the cylindrical body longitudinal axis towards the forward end of the cylindrical body;

a second blade having a second blade longitudinal axis; and a second blade abutment leg secured to the second blade and being oriented at a substantially orthogonal angle relative to the second blade longitudinal axis, the second blade being pivotally mounted about the slot axle proximal to a juncture of the second blade abutment leg and the second blade such that the second blade can project from a second side of the enclosed slot at an oblique angle relative to the cylindrical body longitudinal axis towards the rearward end of the cylindrical body and the second blade abutment leg can project from the second side of the enclosed slot at an oblique angle relative to the cylindrical body longitudinal axis towards the forward end of the cylindrical body;

an arrow tip including an arrow tip shank extending into the cylindrical tip receiving cavity, and an arrow tip shank threaded boss projecting from the arrow tip shank and being threadably engaged with the internally threaded bore of the cylindrical body, the arrow tip shank threaded boss extending into the enclosed slot such that a pivoting of the first and second blades towards a forward end of the cylindrical body will cause the first and second blade abutment legs to engage the arrow tip shank threaded boss to preclude pivoting of the first and second blades relative to the cylindrical body towards the forward end thereof past a position wherein the blade longitudinal axis are oriented so as to extend substantially orthogonal relative to the cylindrical body longitudinal axis, whereby the arrow tip can be rotated to effect axial threaded retraction of the arrow tip shank threaded boss from the internally threaded bore of the cylindrical body so as to permit pivoting of the first and second blades relative to the cylindrical body towards the forward end thereof past a position wherein the blade longitudinal axis are oriented so as to extend substantially orthogonal relative to the cylindrical body longitudinal axis.

2. An arrowhead comprising:

a cylindrical body having a forward end spaced from a rearward end and a cylindrical body longitudinal axis directed longitudinally through the forward and rearward ends, the cylindrical body being shaped so as to define an enclosed slot directed diametrically through the cylindrical body and between the forward and rearward ends thereof, and an internally threaded bore extending from the forward end of the cylindrical body and into communication with the enclosed slot;

a slot axle mounted to the cylindrical body and extending substantially orthogonally relative to the cylindrical body longitudinal axis thereof, the slot axle being positioned between the forward and rearward ends of the cylindrical body and oriented proximal to the internally threaded bore;

a first blade having a first blade longitudinal axis; and a first blade abutment leg secured to the first blade and being oriented at a substantially orthogonal angle relative to the first blade longitudinal axis, the first blade being pivotally mounted about the slot axle proximal to a juncture of the first blade abutment leg and the first blade such that the first blade can project from a first side of the enclosed slot at an oblique angle relative to the cylindrical body longitudinal axis towards the rearward end of the cylindrical body and the first blade abutment leg can project at an oblique angle relative to the cylindrical body longitudinal axis towards the forward end of the cylindrical body;

a second blade having a second blade longitudinal axis; and a second blade abutment leg secured to the second blade and being oriented at a substantially orthogonal angle relative to the second blade longitudinal axis, the second blade being pivotally mounted about the slot axle proximal to a juncture of the second blade abutment leg and the second blade such that the second blade can project from a second side of the enclosed slot at an oblique angle relative to the cylindrical body longitudinal axis towards the rearward end of the cylindrical body and the second blade abutment leg can project at an oblique angle relative to the cylindrical body longitudinal axis towards the forward end of the cylindrical body;

an arrow tip including an arrow tip shank threaded boss projecting therefrom and being threadably engaged with the internally threaded bore of the cylindrical body, the arrow tip shank threaded boss extending into the enclosed slot such that a pivoting of the first and second blades towards a forward end of the cylindrical body will cause the first and second blade abutment legs to engage the arrow tip shank threaded boss to preclude pivoting of the first and second blades relative to the cylindrical body towards the forward end thereof past a position wherein the blade longitudinal axis are oriented so as to extend substantially orthogonal relative to the cylindrical body longitudinal axis, whereby the arrow tip can be rotated to effect axial threaded retraction of the arrow tip shank threaded boss from the internally threaded bore of the cylindrical body so as to permit pivoting of the first and second blades relative to the cylindrical body towards the forward end thereof past a position wherein the blade longitudinal axis are oriented so as to extend substantially orthogonal relative to the cylindrical body longitudinal axis.

* * * * *